United States Patent [19]
Niiro et al.

[11] 4,296,996
[45] Oct. 27, 1981

[54] FEEDTHROUGH FOR OPTICAL FIBER

[75] Inventors: Yasuhiko Niiro, Yokohama; Kahei Furusawa, Kamifukuoka; Akira Okada, Tokyo, all of Japan

[73] Assignee: Kokusai Denshin Denwa Kabushiki Kaisha, Tokyo, Japan

[21] Appl. No.: 58,251

[22] Filed: Jul. 17, 1979

[30] Foreign Application Priority Data

Jul. 18, 1978 [JP] Japan ................. 53-86734

[51] Int. Cl.³ .................................................. G02B 7/26
[52] U.S. Cl. .............................. 350/96.20; 174/70 S
[58] Field of Search ............... 350/96.20, 96.21, 96.23, 350/96.30, 96.33; 174/70 S; 427/162, 163, 166, 168

[56] References Cited

U.S. PATENT DOCUMENTS

| | | | |
|---|---|---|---|
| 2,945,914 | 7/1960 | Aamodt | 174/70 S X |
| 3,019,515 | 2/1962 | Whitehurst et al. | 350/96.33 X |
| 4,033,668 | 7/1977 | Presby | 350/96.21 |
| 4,089,585 | 5/1978 | Slaughter et al. | 350/96.23 |
| 4,166,672 | 9/1979 | Gilbert | 350/96.20 |
| 4,172,212 | 10/1979 | Heinzer | 350/96.21 X |

FOREIGN PATENT DOCUMENTS

| | | | |
|---|---|---|---|
| 2721347 | 11/1978 | Fed. Rep. of Germany | 350/96.21 |
| 2000390 | 1/1979 | United Kingdom | 350/96.20 |
| 2003294 | 3/1979 | United Kingdom | 350/96.21 |

OTHER PUBLICATIONS

Pinnow et al., "Reductions In Static Fatigue . . .", *Appl. Phys. Lett.*, vol. 34, No. 1, Jan. 1979, pp. 17–19.
Almeida et al., "On Line-Metal Coating of Optical Fibres", *Optik*, vol. 53, No. 3, Jun. 1979, pp. 231–233.

*Primary Examiner*—John D. Lee
*Attorney, Agent, or Firm*—Robert E. Burns; Emmanuel J. Lobato; Bruce L. Adams

[57] ABSTRACT

An optical fiber feedthrough for an optical submerged repeater for use in an optical fiber submarine cable, in which a metal film is coated on the outer peripheral surface of an optical fiber to be introduced into the repeater, and in which a thermoplastic material, such as polyethylene or the like, is filled between the inner wall of a hole made in an end face plate of a pressure resisting container of the repeater and the metal film.

3 Claims, 6 Drawing Figures

FEEDTHROUGH FOR OPTICAL FIBER

BACKGROUND OF THE INVENTION

1. Field of the Invention

This invention relates to a feedthrough of an optical submerged repeater used in a long-distance, optical-fiber submarine cable system in the field of optical communication employing a low-loss optical fiber.

2. Description of the Prior Art

An optical submerged repeater is laid in the sea at a depth of several thousand meters and exposed to a water pressure of several hundred atmospheric pressures; therefore, optical and electronic circuits of the optical submerged repeater are housed in a pressure resisting container made of a material of high durability against seawater, for example, stainless steel or beryllium copper. The optical and electronic circuits in the pressure resisting container and an optical-fiber submarine cable are interconnected via a feedthrough attached to an end face plate of the pressure resisting container to serve as an introducing part for an optical fiber and a power feeding conductor. The pressure in the pressure resisting container is usually 0 to 1 atmospheric pressures in terms of gauge pressure and a pressure difference between the inside and outside of the pressure resisting container is very large. Accordingly, the feedthrough is required to have a construction which withstands a high pressure while retaining a high degree of airtightness.

SUMMARY OF THE INVENTION

An object of the present invention is to provide an optical fiber feedthrough for interconnecting an optical circuit in the pressure resisting container to an external optical-fiber submarine cable.

The optical fiber feedthrough of this invention is required to satisfy the following requirements:

The feedthrough:

(1) Has a high degree of airtightness which prevents seawater from entering into the pressure resisting container through the optical fiber feedthrough in the sea at a depth of about ten thousand meters;

(2) Has a high pressure resisting construction which prevents that a non-uniform force is applied to the optical fiber in the feedthrough to bend or break the optical fiber; and (3) Satisfies the above conditions (1) and (2) over as long a period as more than twenty years.

This invention is intended to materialize an optical fiber feedthrough which satisfies such requirements as mentioned above and in which the outer peripheral surface of a cladding of an optical fiber, which is weak mechanically, is coated with a metal to provide for an increased mechanical strength of the optical fiber against a tensile force or an external force, and in which close contact between the optical fiber and the metal coating is ensured by the long entire length of the coating so that close contact between the metal coating and polyethylene or like thermoplastic material inserted between the coating and an end face plate of a pressure resisting container is enhanced by forming an oxide film on the surface of the metal coating or by increasing the thickness of a part of the metal coating, thereby to ensure high pressure resistance and a high degree of airtightness of the feedthrough.

BRIEF DESCRIPTION OF THE DRAWING

This invention will be hereinafter described in detail with reference to the accompanying drawing, in which.

DETAILED DESCRIPTION

Figure 1A:
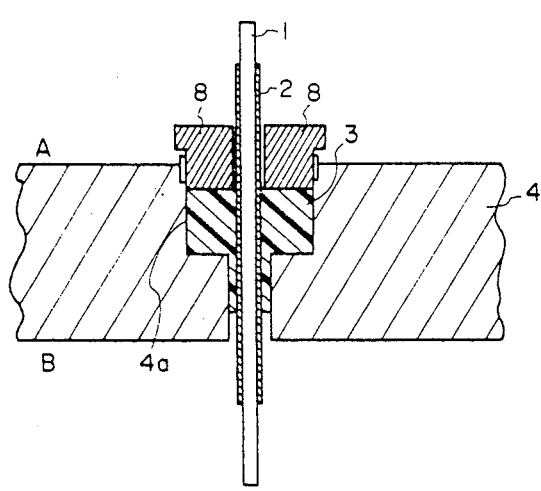
FIG. 1A is a longitudinal sectional view of an embodiment of this invention.
Figure 1B:
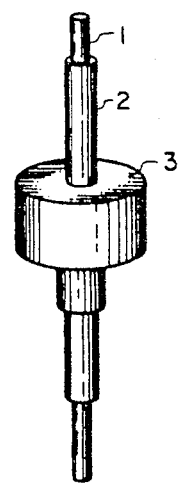
FIG. 1B is a perspective view illustrating the principal part of the embodiment of FIG. 1A.

FIG. 1A is a sectional view of an embodiment of this invention, showing an optical fiber feedthrough attached to a part of an end face plate of a pressure resisting container. The outside and inside of the pressure resisting container are indicated by A and B, respectively. FIG. 1B illustrates in perspective an optical fiber feedthrough unit which is inserted into a feedthrough unit receiving hole 4a made in an end face plate 4. In FIGS. 1A and 1B, reference numeral 1 indicates an optical fiber and 2 designates a copper or like metal thin film coated around a cladding of the optical fiber by which this invention is characterized; the metal film 2 can easily be deposited by sputtering or ion plating on glass. The metal film 2 can also be formed by non-electrolytic plating. Further, it is also possible that the metal film 2 closely formed by sputtering or ion plating around the optical fiber 1 is made thicker by means of plating or that two layers of different metals are deposited to different thicknesses. Thus, various methods can be employed for forming the metal film 2 around the optical fiber 1 and a metal of a desired thickness can easily be coated closely around the optical fiber 1.

The optical fiber 1 given the metal coating by such method as described above is further enclosed in a structure of a thermoplastic material 3, such as polyethylene or the like, to provide an optical fiber feedthrough unit, as shown in FIG. 1B, and the feedthrough unit is inserted into the hole 4a made in the end face plate 4 and is then fixed by a metal fitting 8. The structure 3 is formed of polyethylene or a like thermoplastic material. After an oxide film is formed on the surface of the metal coating 2 to achieve close contact between it and the polyethylene material, polyethylene or a like material is formed to conform to the hole 4a of the end face plate 4. This can easily be done by molding or the like. The structure thus obtained is inserted into the hole 4a of the end face plate 4 and fixed therein by the metal fitting 8, by which can be obtained a feedthrough of high pressure resistance and high airtightness.

Another example of the feedthrough can be obtained as follows: An optical fiber coated with a metal is inserted into the hole 4a of the end face plate 4 and then the part of the hole 4a of the end face plate 4 is formed by molding so that the metal film 2 is in close contact with the polyethylene structure 3, thereby to fix the metal coated film and the polyethylene structure 3 relative to each other.

Figure 2A:
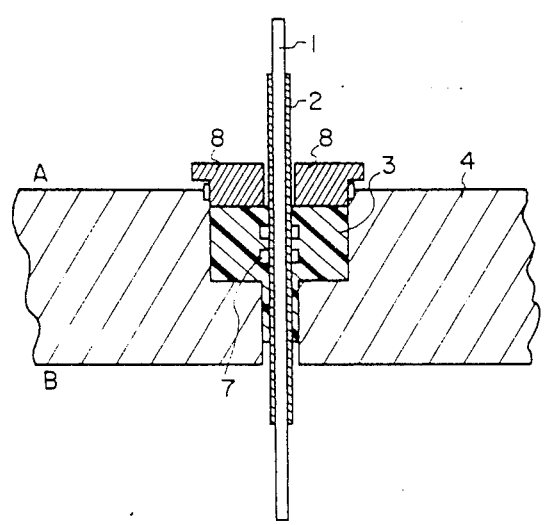
FIG. 2A is a longitudinal sectional view illustrating another embodiment of this invention.
Figure 2B:
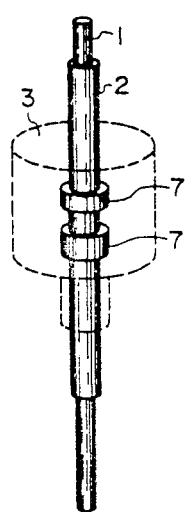
FIG. 2B is a perspective view showing the principal part of the embodiment of FIG. 2A.

FIGS. 2A and 2B show another example in which the metal coating of the optical fiber is formed thick at one or more parts to provide thick portions 7 for providing for improved close contact of the metal coating with the polyethylene mold 3, thereby preventing displacement of the optical fiber in a vertical direction.

Figure 3A:
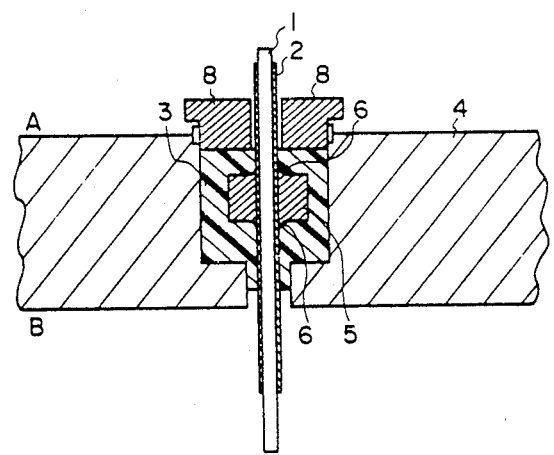
FIG. 3A is a longitudinal sectional view illustrating a further embodiment of this invention.
Figure 3B:
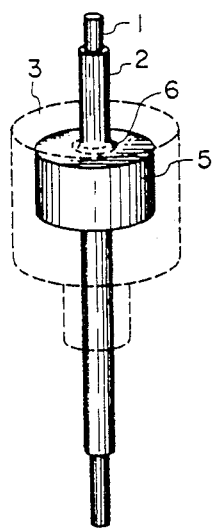
FIG. 3B is a perspective view showing the principal part of the embodiment of FIG. 3A.

FIGS. 3A and 3B illustrate another example, in which a ring-shape metal 5 is mounted by brazing on the metal coating 2, as indicated by numeral 6, and molded as a unitary structure with the polyethylene structure 3 so as to provide for improved close contact between the metal coating of the optical fiber and the polyethylene molding 3 and enhanced pressure resistance.

The outer diameter of the optical fiber is as small as 100 to 200 $\mu$m, whereas the metal coating is as thin as several to a few dozen $\mu$m and its outer diameter is as small as 300 to 500 $\mu$m; in contrast thereto, the feedthrough is as long as several cm compared with its diameter. Therefore, such simple structure as shown in the foregoing examples achieve sufficient reliability for a long use.

The present invention has the following advantages:

(1) By forming the metal film in close contact with the optical fiber of low mechanical strength, the mechanical strength of the optical fiber against a tensile force and an external force can be increased.

(2) The optical fiber made of a glass material and the metal coating are well in close contact with each other and a high degree of close contact required can be ensured by increasing the length of the metal film of the optical fiber in its lengthwise direction, so that a feedthrough of good airtightness can be obtained.

(3) A space between the optical fiber coated with metal and the inner wall of a hole made in the end face plate for passing through the optical fiber is filled with polyethylene or a like thermoplastic material by means of molding, by which it is possible to provide a feedthrough easy to manufacture.

(4) To improve the close contact between the metal coating and the thermoplastic material structure, a ring-shaped metal is mounted by brazing on the metal coating or the coating is formed thick partly, by which it is possible to obtain a feedthrough easy to produce and of high reliability.

What we claim is:

1. In a submarine repeater, a pressure-resisting solid container having a feed-through opening for receiving an optical fiber, an optical fiber extending longitudinally through said opening, a sealing thermoplastic material filling space between the fiber and inner surfaces of said through opening in said pressure-resisting solid container, said optical fiber having a metallic film coating circumferentially and longitudinally thereon in close contact with said sealing thermoplastic material to ensure a seal having resistance to high fluid pressure and airtightness between the optical fiber and said thermoplastic material, said metallic film coating having an oxide film thereon to provide enhanced sealing close contact between the metallic film coating and the thermoplastic material.

2. In a submarine repeater according to claim 1, in which said metallic film coating is thickened in an area defining a collar-like enlargement circumferentially of the optical fiber, said feedthrough opening having a large inner diameter in an axial portion thereof to accommodate said enlargement thereby to prevent longitudinal displacement of said optical fiber.

3. In a submarine repeater according to claim 1, including a metallic ring on said optical fiber circumferentially thereof for precluding longitudinal displacement of said optical fiber, said feedthrough opening having an enlarged inner diameter in an axial portion thereof to accommodate said ring thereby to preclude said longitudinal displacement of the optical fiber.

* * * * *

UNITED STATES PATENT AND TRADEMARK OFFICE
CERTIFICATE OF CORRECTION

PATENT NO. : 4,296,996
DATED : Oct. 27, 1981
INVENTOR(S) : Yasuhiko Niiro et al.

It is certified that error appears in the above—identified patent and that said Letters Patent is hereby corrected as shown below:

Cancel the Fig. of drawing on the Title Page, and substitute the Fig. shown below.

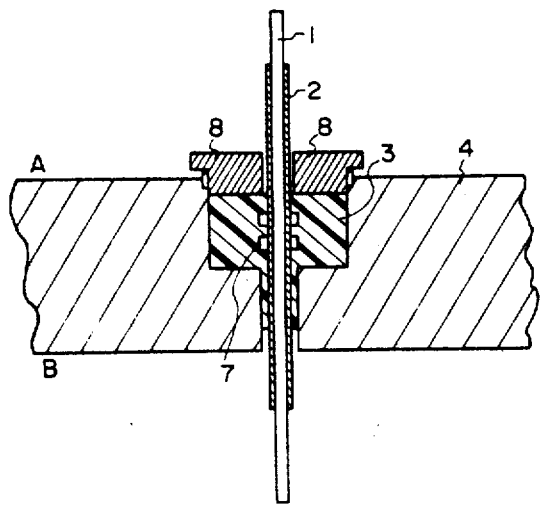

Signed and Sealed this

Second Day of February 1982

[SEAL]

Attest:

Attesting Officer

GERALD J. MOSSINGHOFF

Commissioner of Patents and Trademarks